United States Patent

Huang et al.

(10) Patent No.: US 8,447,903 B2
(45) Date of Patent: *May 21, 2013

(54) ELECTRONIC DEVICE AND METHOD FOR AUTOMATICALLY CONTROLLING OPERATION OF THE ELECTRONIC DEVICE

(75) Inventors: Wen-Tse Huang, Taipei Hsien (TW); Po-Hsu Chien, Taipei Hsien (TW)

(73) Assignee: Wistron Corporation, Taipei Hsien (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/343,525

(22) Filed: Jan. 4, 2012

(65) Prior Publication Data

US 2012/0105721 A1 May 3, 2012

Related U.S. Application Data

(63) Continuation of application No. 12/552,431, filed on Sep. 2, 2009, now Pat. No. 8,209,451.

(30) Foreign Application Priority Data

Nov. 27, 2008 (TW) ................................ 97145916 A

(51) Int. Cl.
*G06F 1/04* (2006.01)
*G06F 3/00* (2006.01)
*H04N 5/44* (2011.01)

(52) U.S. Cl.
USPC ............... 710/58; 348/553; 710/10; 710/14; 713/502

(58) Field of Classification Search
None
See application file for complete search history.

(56) References Cited

U.S. PATENT DOCUMENTS

| 7,312,983 | B2 | 12/2007 | Tsai et al. |
| 2006/0271984 | A1 | 11/2006 | Ishihara |
| 2007/0039027 | A1 | 2/2007 | Zeyher et al. |
| 2008/0209475 | A1 | 8/2008 | Kobayashi |
| 2009/0290065 | A1 | 11/2009 | Asayama et al. |

FOREIGN PATENT DOCUMENTS

| CN | 1964430 | 5/2007 |
| CN | 101222598 | 7/2008 |

OTHER PUBLICATIONS

Office action issued by Taiwanese Patent Office dated Jan. 31, 2012 for corresponding application 97145916 with partial English translation.

*Primary Examiner* — Idriss N Alrobaye
*Assistant Examiner* — Richard B Franklin
(74) *Attorney, Agent, or Firm* — Frommer Lawrence & Haug LLP; Ronald R Santucci

(57) ABSTRACT

An electronic device is adapted to be connected to a plurality of peripheral devices, and includes a storage unit and a control circuit. The storage unit records a preset time and a control list. The control list lists at least a selected one of the electronic device and the peripheral devices, and an operation mode therefor. The control circuit detects whether the preset time matches a reference time, and if so, controls operation of the selected one of the electronic device and the peripheral devices according to settings in the control list.

8 Claims, 4 Drawing Sheets

System Time Setup

| Year:2008 | Month:08 | Day:15 |
| Hour:08 | Minute:30 | Second:00 |

FIG.3

Automatic Activation Time Setup

| Date | Month:08 | Day:15 |
| Start Time | Hour:08 | Minute:30 |
| Duration Time | Hour:2 | Minute:30 |

FIG.4

Control List

| ✓ | Electronic device | 1 | ON |
| ✓ | Peripheral device | 21 | ON |
| ✓ | Peripheral device | 22 | ON |
|   | Peripheral device | 23 | OFF |
|   | Peripheral device | 24 | OFF |

FIG.5

ELECTRONIC DEVICE AND METHOD FOR AUTOMATICALLY CONTROLLING OPERATION OF THE ELECTRONIC DEVICE

This application is a continuation of U.S. patent application Ser. No. 12/552,431 filed Sep. 2, 2009 entitled "Electronic Device and Method for Automatically Controlling Operation of the Electronic Device" and which claims priority of Taiwanese Application No. 097145916, filed on Nov. 27, 2008 the disclosures of both are incorporated herein by reference.

BACKGROUND OF THE INVENTION

1. Field of the Invention

The invention relates to a method for controlling an electronic device, more particularly to a method for automatically controlling an electronic device utilizing the consumer electronic control (CEC) communication protocol.

2. Description of the Related Art

High definition multimedia interface (hereinafter referred to as HDMI) is an interface for transmission of totally digitized video and sound to permit interconnection of a plurality of video or audio devices (e.g., set-top boxes, DVD players, personal computers, televisions, stereo systems, etc.) via a single cable so as to provide digital video and sound of a higher definition, thereby replacing conventional analog audio-visual transmission interfaces, such as SCART, RCA terminals, etc.

The HDMI standard defines a communication protocol known as the consumer electronic control (referred to as CEC hereinafter) communication protocol, which is mainly used to allow a user to utilize an active device to control operations of a plurality of controlled devices that are connected to the active device via the HDMI interface, e.g., using a liquid crystal television (active device) to control turning on or off of a video recorder (controlled device) so as to achieve objectives of one touch play, one touch record, etc., thereby enabling the user to conveniently control electronic devices via the HDMI interface.

Although audio or video devices that support the CEC communication protocol are quite convenient in operation and have become more and more popular, these audio or video devices still require manual control in order to be able to operate, and are incapable of using a certain video or audio device (active device) to control operation of another video or audio device (controlled device) without user control. Therefore, for some people who are often away from home, they may miss favorite TV programs or important information just because they are not physically present to manually control such audio or video devices. Thus, automatic control of audio and video devices that support the CEC communication protocol is the subject of improvement of this invention.

SUMMARY OF THE INVENTION

Therefore, an object of the present invention is to provide a method for automatically controlling operation of an electronic device.

Accordingly, the method for automatically controlling operation of an electronic device of the present invention is adapted for use in an active device that is connected to a plurality of controlled devices. According to the method, a preset time is first set in the active device, at least one of the active device and the controlled devices is selected, and an operation mode therefor is set. After setup, the active device starts detecting whether the preset time matches a reference time, and if so, controls operation of the selected at least one of the active device and the controlled devices according to previously made settings.

Further, the active device will detect whether the selected at least one of the active device and the controlled devices has received a forcing signal. If the forcing signal is received before the reference time reaches the preset time, the active device will control operation of the selected at least one of the active device and the controlled devices that has received the forcing signal according to the forcing signal. On the other hand, if the reference time matches the preset time, the active device will detect whether the operation of the selected at least one of the active device and the controlled devices that has received the forcing signal is consistent with an operation specified by the forcing signal. If so, the selected at least one of the active device and the controlled devices that has received the forcing signal is removed from the previously made settings, and operation of another selected at least one of the active device and the controlled devices is controlled according to the settings.

Another object of the present invention is to provide an electronic device capable of automatic control.

The electronic device according to the present invention is adapted to be connected to a plurality of peripheral devices, and includes a storage unit and a control circuit. The storage unit records a preset time and a control list. The control list lists at least a selected one of the electronic device and the peripheral devices, and an operation mode therefor. The control circuit detects whether the preset time matches a reference and if so, controls operation of the selected one of the electronic device and the peripheral devices according to settings in the control list.

Preferably, the control circuit detects whether the selected one of the electronic device and the peripheral devices in the control list has received a forcing signal. If the forcing signal is received before the reference time reaches the preset time, the control circuit will control operation of the selected one of the electronic device and the peripheral devices that has received the forcing signal according to the forcing signal. However, if the preset time matches the reference time, the control circuit will detect whether the operation of the selected one of the electronic device and the peripheral devices that has received the forcing signal is consistent with an operation specified by the forcing signal. If so, the selected one of the electronic device and the peripheral devices that has received the forcing signal is removed from the control list, and the control circuit controls the operation of another selected one of the electronic device and the peripheral devices in the control list according to the control list.

The advantageous effect of this invention is that the electronic device can automatically control the electronic device itself and the peripheral devices connected thereto via the CEC communication protocol to enable the same to operate in the previously set operation modes.

BRIEF DESCRIPTION OF THE DRAWINGS

Other features and advantages of the present invention will become apparent in the following detailed description of the preferred embodiments with reference to the accompanying drawings, of which:

FIG. 3 is a diagram showing a user interface with options that can be set by a user during setup of a reference time;

FIG. 4 is a diagram showing a user interface with options that can be set by the user during setup of a preset time;

FIG. 5 is a diagram showing a user interface with options that can be selected by the user during setup of a control list.

DETAILED DESCRIPTION OF THE PREFERRED EMBODIMENTS

Figure 1:
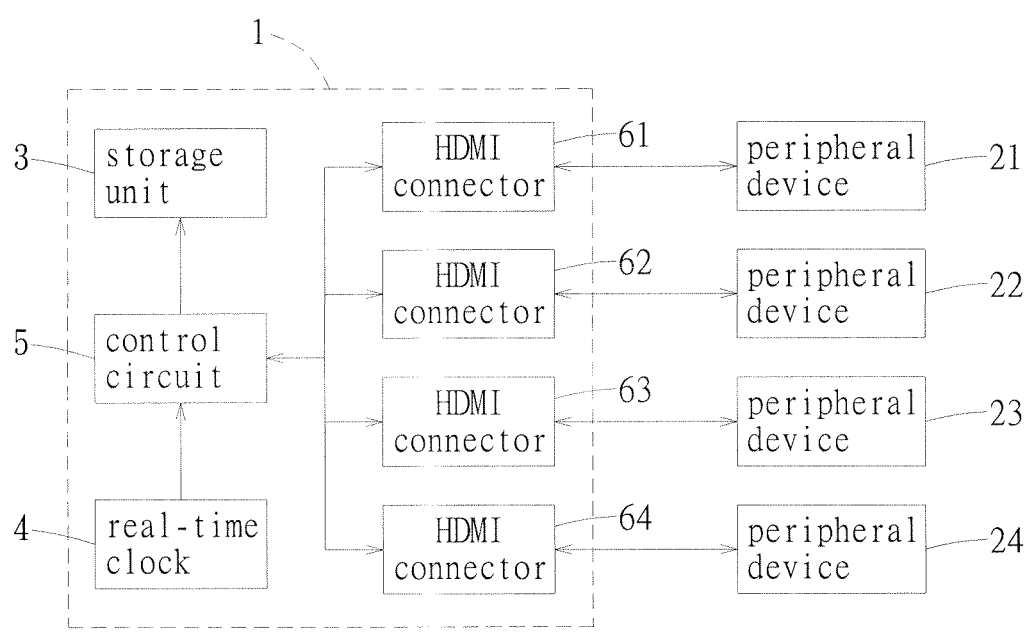
FIG. 1 is a circuit block diagram to illustrate a circuit architecture of an electronic device according to the invention.

FIG. 1 shows the preferred embodiment of an electronic device 1 according to the present invention. The electronic device 1 (an active device) is adapted to be connected to a plurality of peripheral devices 21, 22, 23, 24 (controlled devices), and includes a storage unit 3, a real-time clock (RTC) 4, and a control circuit 5. The storage unit 3 stores a preset time and a control list. The control list stores a listing of the peripheral devices 21, 22, 23, 24 and the electronic device 1 to be controlled and modes of operation therefor for selection by a user. The real-time clock 4 keeps track of the date and time, and generates a reference time. The control circuit 5 detects whether a preset time matches the reference time, and if so, controls operation of a selected one or selected ones of the peripheral devices 21, 22, 23, 24 and the electronic device 1 in sequence according to information in the control list.

In this embodiment, the electronic device 1 is a liquid crystal television and is connected to the four peripheral devices (e.g., video recorder, stereo system, etc.) 21, 22, 23, 24. In other words, the electronic device 1 is an active device responsible for controlling operations of the four peripheral devices 21, 22, 23, 24 (controlled devices). Furthermore, the electronic device 1 and the peripheral devices 21, 22, 23, 24 support the CEC communication protocol, and use HDMI for data transmission thereamong. In addition, since the formats of data transmitted among the electronic device 1 and the peripheral devices 21, 22, 23, 24 may not be the same, the electronic device 1 further includes four HDMI connectors 61, 62, 63, 64, each of which interconnects the control circuit 5 and a respective one of the peripheral devices 21, 22, 23, 24 for decoding or encoding the respective data format and subsequent transmission to the control circuit 5 for processing.

Figure 2:
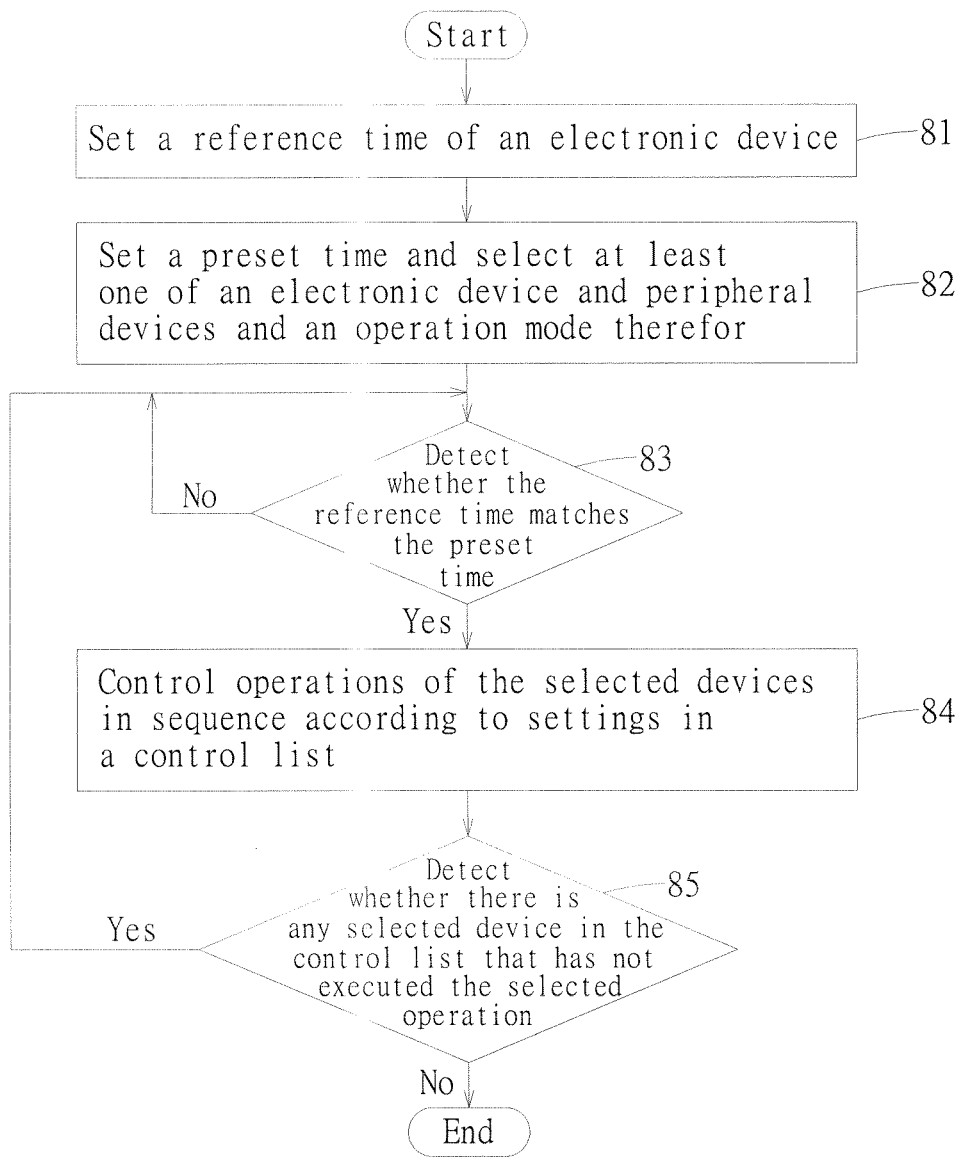
FIG. 2 is a flowchart to illustrate the first preferred embodiment of a method for automatically controlling operation of an electronic device according to the invention.

FIG. 2 illustrates the first preferred embodiment of a method for automatically controlling operation of an electronic device according to the present invention. First, in step 81, a reference time to be generated by the real-time clock 4 of the electronic device 1 is set. The reference time is a system time of the electronic device 1, i.e., the local time, such as the clock time shown at the lower right corner of the screen of a computer operating under the Windows operating system. In addition, the control circuit 5 will cause display of a user interface, such as a "System Time Setup" interface shown in FIG. 3, on a screen of the electronic device 1 for a user to set the reference time. Options that can be set include year, month, day, hour, minute, and second. It should be noted that this step needs to be executed only once, after purchase of the electronic device 1 or at the first time of use, and that the real-time clock 4 therein will start keeping track of the date and time.

Next, in step 82, a preset time is set, and at least one of the electronic device 1 and the peripheral devices 21, 22, 23, 24 and an operation mode therefor are selected. As in the previous step, a user interface, such as an "Automatic Activation Time Setup" interface shown in FIG. 4, is displayed on the screen of the electronic device 1 through the control circuit 5 for setup of the preset time by the user. Options that can be set include date, start time, and duration time. For example, the date is set to be August 15, the start time is set to be 8:30, and the duration time is set to be 2 hours 30 minutes.

In addition, after the user has set the preset time, the control circuit 5 will cause display of a user interface, such as a "Control List" interface shown in FIG. 5, on the screen of the electronic device 1 to allow the user to select one or more of the electronic device 1 and the peripheral devices 21, 22, 23, 24 to be controlled and the mode(s) of operation therefor. In this example, the electronic device 1 and the peripheral devices 21, 22 are selected, and the selected modes of operation therefor are to turn the selected devices ON.

After the user has completed the time setup and confirmed the selections, the electronic device 1 will store the preset time and the information associated with the user's selections or settings in the storage unit 3 of the electronic device 1. The flow then goes to step 83.

In step 83, the control circuit 5 detects whether the reference time generated by the real-time clock 4 matches the preset time stored in the storage unit 3. In the case of the start time shown in FIG. 4, the control circuit 5 will detect whether the system time is 8:30, August $15^{th}$. If so, the flow goes to step 84; otherwise, the detection continues.

Before illustrating step 84, it is first assumed that the user turns off the electronic device 1 after setting the preset time and making the desired selections from the control list. It is noted that, although the electronic device 1 is turned off, power supply thereto is not completely cut off. As a matter of fact, most of the circuits thereof are merely deactivated and put in an idle state, and the control circuit 5 is still operating. The peripheral devices 21, 22, 23, 24 are also merely turned off and put in an idle state. Therefore, once the control circuit 5 detects that the system time is 8:30, August $15^{th}$ (which is in agreement with the start time in FIG. 4), step 84 is executed. In step 84, the control circuit 5 controls the operations of the selected ones of the electronic device 1 and the peripheral devices 21, 22, 23, 24 in sequence according to the settings in the control list, which means, at 8:30, August $15^{th}$, the control circuit 5 will first turn on the electronic device 1 and then turn on the peripheral devices 21, 22 through the HDMI connectors 61, 62 using the CEC communication protocol.

In other words, assuming that the peripheral devices 21, 22 are a DVD player and a stereo system, respectively, when the system time of the electronic device 1 is 8:30, August $15^{th}$, the liquid crystal television (the electronic device 1), the video recorder (the peripheral device 21), and the stereo system (the peripheral device 22) are automatically turned on, and any news program, TV program, etc., that is/are being played at that time will be recorded. Therefore, even if the user is away from home, TV programs can still be recorded through the automatic control of the electronic device 1 as described hereinabove, so that the user will not miss any important news or programs while away. The user only needs to set the proper time and to select the ones of the electronic device 1 and the peripheral devices 21, 22, 23, 24 to be controlled and the desired operation modes beforehand.

In step 85, the control circuit 5 detects whether there is any selected device in the control list that has not executed the selected operation. If so, step 83 is repeated. In this embodiment, apart from the start time, the setup of the preset time also includes the setup of a duration time (2 hours and 30 minutes), that is, the period of time during which a selected device will operate. To illustrate using the above example, the electronic device 1, and the peripheral devices 21, 22 will be turned on in sequence at 8:30, August 15$^{th}$, and will operate for 2 hours and 30 minutes before they are automatically turned off at 11:00, August 15$^{th}$. Therefore, the control circuit 5 will repeat step 83 to detect if the reference time generated by the real-time clock 4 is 11:00. If so, the control circuit 5 will first turn off the peripheral device 21 and the peripheral device 22 and then turn off display-related circuits of the electronic device 1.

It should be noted that this embodiment is not limited to automatic turning on or off of the electronic device 1 and the peripheral devices 21, 22, 23, 24. The setup of the preset time may be done in various ways, and there are various modes of operation for selection for the devices, such as reducing sound volume of the electronic device 1 and the peripheral devices 21, 22, 23, 24 during the period from 10 p.m. to 6 a.m., scheduling the electronic device 1 to automatically turn on at 8 a.m. every morning, etc. With proper adjustment of the user interfaces to allow the user to set up the preset time, the device(s) desired to be controlled, and the modes of operation intended therefor, in conjunction with the control circuit 5 that sends control signals to corresponding ones of the electronic device 1 and the peripheral devices 21, 22, 23, 24, the object of automatically controlling the operation of an electronic device can be achieved.

Figure 6:
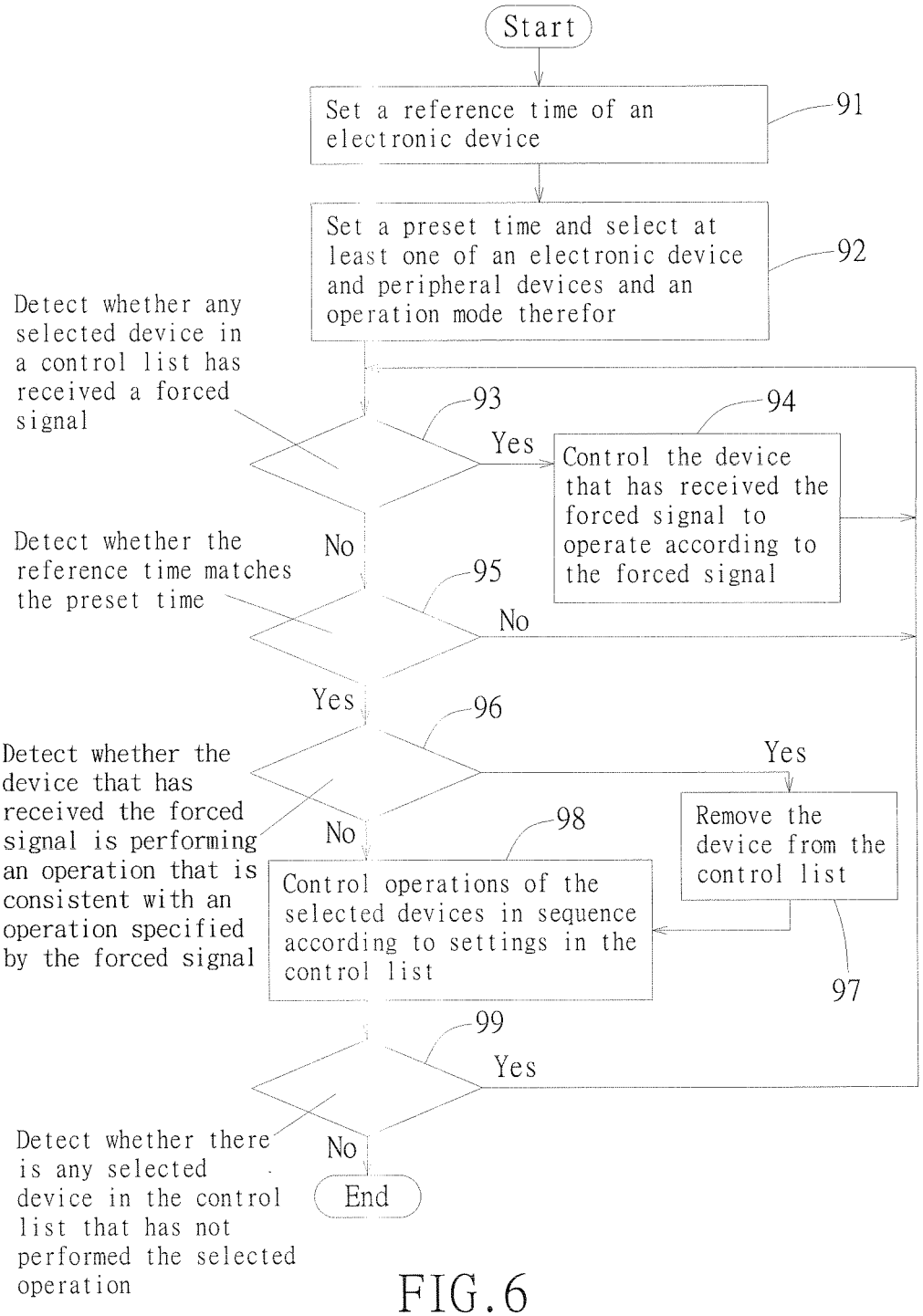
FIG. 6 is a flowchart to illustrate the second preferred embodiment of a method for automatically controlling operation of an electronic device according to the invention.

FIG. 6 shows the second preferred embodiment of a method for automatically controlling operation of an electronic device according to the invention. The circuit architecture of the electronic device 1 in this embodiment is the same as that of the electronic device 1 in the first preferred embodiment. The difference resides in the way the control circuit 5 controls operation of a selected one of the electronic device 1 and the peripheral devices 21, 22, 23, 24 according to the control list when the selected one of the electronic device 1 and the peripheral devices 21, 22, 23, 24 receives a forcing signal.

Steps 91, 92 of the method of this embodiment are the same as steps 81, 82 of the first preferred embodiment, in which the user first sets up the reference time to be generated by the real-time clock 4 of the electronic device 1, and then sets up a preset time and selects at least one of the electronic device 1 and the peripheral devices 21, 22, 23, 24 and the operation mode therefor.

In step 93, the control unit 5 detects whether any selected one of the electronic device 1 and the peripheral devices 21, 22, 23, 24 in the control list stored in the storage unit 3 has received a forcing signal. In the case of the example given in the first preferred embodiment, the control circuit 5 will detect which of the electronic device 1 and the peripheral devices 21, 22 has received a forcing signal. The forcing signal in this embodiment refers to a command received from a central processing unit (not shown) by the control circuit 5 when the user performs a manual control. If the user manually turns on the electronic device 1 before the preset time 8:30 (e.g., at 8:15), the electronic device 1 will receive a forcing signal from the central processing unit and cause the control circuit 5 to execute step 94 in response thereto.

In step 94, the control circuit 5 controls the device that has received the forcing signal to operate according to the forcing signal. In the above example, the forcing signal is to control "turning on of the electronic device 1." Therefore, the control circuit 5 will control the electronic device 1 and turn on the electronic device 1 upon detecting receipt of the forcing signal by the electronic device 1. In addition, if the time of receipt of the forcing signal is earlier than the preset time, the control circuit 5 will repeat step 93 to continue to detect if any of the electronic device 1 and the peripheral devices 21, 22 has received a forcing signal.

Step 95 is identical to step 83 of the first preferred embodiment, that is, the control circuit 5 detects whether the reference time generated by the real-time clock 4 matches the preset time stored in the storage unit 3. If not, this means that the reference time has yet to reach the preset time, and steps 93 and 95 are repeated to continue to detect if the reference time matches the preset time and if any of the electronic device 1 and the peripheral devices 21, 22 has received a forcing signal. If the reference time matches the preset time, step 96 is executed.

In step 96, the control circuit 5 detects whether the device that has received the forcing signal is performing an operation that is consistent with an operation specified by the forcing signal. Continuing with the above example, when the reference time reaches 8:30, August 15$^{th}$, the control circuit 5 will detect whether the electronic device 1 which has received the forcing signal is still in an ON state. If so, this indicates that the electronic device 1 has continued with the operation it was commanded to perform according to the forcing signal generated at 8:15, and step 97 is executed. Otherwise, step 98 is executed.

In step 97, the control circuit 5 removes the selection of the electronic device 1 and the operation mode therefor from the control list stored in the storage unit 3. The reason for this is the fact that the electronic device 1 has continued with the operation it was commanded to perform according to the forcing signal means that the user intends to "take over" control of the operation of the electronic device 1. In other words, with the electronic device 1 turned on manually by the user at 8:15, if the control circuit 5 does not remove the selection of the electronic device 1 and the operation mode therefor from the control list, an anomalous situation in which the control circuit 5 will attempt to turn on the electronic device 1 once again at 8:30 will occur. Therefore, the completion of step 97 means that control of none of the devices in the control list is to be "taken over" by the user, and the control circuit 5 will execute step 98.

Step 98 is identical to step 84 of the first preferred embodiment, in which the control circuit 5 controls operations of the selected devices in sequence according to the settings in the control list. Since the selection of the electronic device 1 has been removed from the control list, the control circuit 5 only needs to turn on the peripheral devices 21, 22 in sequence. Finally, in step 99, the control circuit 5 detects whether there is any selected device in the control list that has not performed the selected operation because the preset time associated therewith is not yet reached. If so, step 93 is executed.

It should be noted that, unless the selected devices receive forcing signals that are generated as a result of manual control thereof by the user, generally speaking, the control circuit 5 will control operations of the selected devices in sequence according to the setup of the control list by the user. However, if the operation of a selected device in the control list as initiated by the forcing signal is in conflict with the preset operation, the control circuit 5 will control operation of the selected device according to the forcing signal. Thus, the control circuit 5 will not control the selected device to perform the same operation twice (that is, controlling the selected device to perform the selected operation mode once upon receipt of the forcing signal and controlling the selected device to perform the selected operation mode once again when the reference time matches the preset time), so that manual control will not be in conflict with automatic control.

In sum, in the electronic device 1 of the invention, through use of the CEC communication protocol and by allowing the user to set up a preset time and select devices desired to be controlled and the operation modes of the selected devices, the control circuit 5 of the electronic device 1 is capable of controlling operations of the selected devices in sequence according to the previously made settings, thereby achieving automatic control. Thus, the user can have better convenience in terms of use, and drawbacks associated with manual control of the devices, e.g., the user may miss any favorite programs or important information, can be eliminated.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A method for automatically controlling operation of an electronic device, said method being adapted for use in a television device that is connected to a plurality of peripheral devices, said method comprising the following steps:
    (a) setting a preset time in the television device, and selecting, and setting an operation mode for, at least one of the television device and the peripheral devices;
    (b) detecting whether the preset time matches a reference time, and if so, executing step (c);
    (c) controlling operation of the selected at least one of the television device and the peripheral devices; and
    (d) detecting whether the selected at least one of the television device and the peripheral devices has received a forcing signal, and if so, controlling operation of the selected at least one of the television device and the peripheral devices that has received the forcing signal according to the forcing signal;
    wherein the television device is connected to each of the peripheral devices via high definition multimedia interface (HDMI).

2. The method for automatically controlling operation of an electronic device according to claim 1, wherein, in step (a), the operation mode is turning on the selected one of the television device and the peripheral devices.

3. The method for automatically controlling operation of an electronic device according to claim 1, wherein, in step (a), the operation mode is turning off the selected one of the television device and the peripheral devices.

4. The method for automatically controlling operation of an electronic device according to claim 1, wherein, in step (b), the reference time is a system time of the television device.

5. A television device adapted to be connected to a plurality of peripheral devices, said television device comprising:
    a storage unit for storing a preset time and a control list, the control list listing at least a selected one of said television device and the peripheral devices and an operation mode therefor;
    a control circuit for detecting whether the preset time matches a reference time, and if so, controlling operation of the selected one of said television device and the peripheral devices according to the control list; and
    wherein said control circuit first detects whether the selected one of said television device and the peripheral devices in the control list has received a forcing signal, and if so, controls operation of the selected one of said television device and the peripheral devices that has received the forcing signal according to the forcing signal before detecting whether the preset time matches the reference time;
    wherein said television device is adapted to be connected to the peripheral devices via high definition multimedia interface (HDMI).

6. The television device according to claim 5, wherein the operation mode is turning on the selected one of said television device and the peripheral devices in the control list.

7. The television device according to claim 5, wherein the operation mode is turning off the selected one of said television device and the peripheral devices in the control list.

8. The television device according to claim 5, further comprising a real-time clock for generating the reference time.

* * * * *